United States Patent
Buss (10) Patent No.: US 10,992,118 B1
(45) Date of Patent: Apr. 27, 2021

(54) WIRE STRIPPING TOOL

(71) Applicant: Donald A. Buss, Macungie, PA (US)

(72) Inventor: Donald A. Buss, Macungie, PA (US)

(*) Notice: Subject to any disclaimer, the term of this patent is extended or adjusted under 35 U.S.C. 154(b) by 257 days.

(21) Appl. No.: 15/803,102

(22) Filed: Nov. 3, 2017

Related U.S. Application Data (60) Provisional application No. 62/416,741, filed on Nov. 3, 2016.

(51) Int. Cl.
 *H02G 1/12* (2006.01)
 *B25B 13/48* (2006.01)
 *B26B 17/00* (2006.01)

(52) U.S. Cl.
 CPC .......... *H02G 1/1214* (2013.01); *B25B 13/48* (2013.01); *B25B 13/481* (2013.01); *B26B 17/00* (2013.01)

(58) Field of Classification Search
 CPC ...... H02G 1/1214; H02G 1/12; H02G 1/1204; H02G 1/1221; H02G 1/1224; H02G 1/1236; H02G 1/1239; B25B 13/48; B25B 17/00; B25B 13/481; E21B 19/16; B26B 17/00
 USPC ................ 81/52, 9.4; 30/90.1–91.2
 See application file for complete search history.

(56) References Cited

U.S. PATENT DOCUMENTS

| | | | | |
|---|---|---|---|---|
| 1,661,056 A | * | 2/1928 | Stack | H02G 1/1214 30/294 |
| 2,361,402 A | * | 10/1944 | Jamieson | H02G 1/1236 72/340 |
| 2,668,464 A | * | 2/1954 | Paules | H01R 43/042 30/91.2 |
| 3,608,401 A | | 9/1971 | Freed | |
| 3,946,487 A | * | 3/1976 | Bieganski | H02G 1/1231 30/90.7 |
| 4,368,654 A | | 1/1983 | Kober et al. | |
| 4,519,278 A | * | 5/1985 | Heldt | B25B 7/00 81/124.4 |
| 5,036,578 A | | 8/1991 | Rivera | |
| 5,205,006 A | | 4/1993 | Panasuk | |
| 5,323,502 A | | 6/1994 | Miller | |
| 7,243,429 B2 | | 7/2007 | Landes et al. | |
| 9,225,152 B2 | | 12/2015 | Anderson et al. | |
| 10,076,829 B2 | * | 9/2018 | Sun | B25B 15/04 |
| 2009/0013477 A1 | * | 1/2009 | Agronin | B25B 21/00 7/107 |
| 2010/0212351 A1 | | 8/2010 | Chapin et al. | |

OTHER PUBLICATIONS

Lineman's wire stripper / cutter / for cables. Secura No. 15. Product listing [online]. © 2018 Virtual Expo Group [retrieved on Aug. 9, 2016]. Retrieved from the Internet: <URL: http://www.directindustry.com/prod/jokari-krampe-gmbh/product-151322-1671508.html>.

* cited by examiner

*Primary Examiner* — Lee D Wilson
*Assistant Examiner* — Robert F Neibaur
(74) *Attorney, Agent, or Firm* — Cramer Patent & Design, PLLC; Aaron R. Cramer (57) ABSTRACT

A wire stripping tool includes a shaft having a handle at a distal end and a wire cutting device at a proximal end. The wire cutting device is a circular metallic form the plane of which is secured centrally and perpendicular to the shaft. A plurality of notches is disposed about the circumference of the circular metallic form.

1 Claim, 7 Drawing Sheets

WIRE STRIPPING TOOL

RELATED APPLICATIONS

The present invention is a continuation-in-part of, was first described in and claims the benefit of U.S. Provisional Application No. 62/416,741 filed Nov. 3, 2016, the entire disclosures of which are incorporated herein by reference.

FIELD OF THE INVENTION

The present invention relates generally to the field of electrical wire devices and more specifically relates to a compact wire stripping device.

BACKGROUND OF THE INVENTION

When performing electrical work using insulated wires, it is often required to strip a portion of the insulation to make the electrical connection. Most devices for stripping insulation or jacket layers from electrical conductors work by clamping or holding the insulated wire or cord, severing the insulation or jacket layer and removing a length of the severed insulation or jacket layer from the wire.

For the most part, such wire strippers include a means for clamping holding the wire and insulation prior to stripping the insulation off the wire by using moveable stripper blades to sever the insulation or jacket layer, and means for moving the stripping blades longitudinally along the wire so as to remove the severed insulation.

The known apparatus or devices for stripping insulation or jacket layers from electrical wires, while being generally acceptable for their intended purposes, exhibit significant drawbacks in respect to their size and inability to fit into very confined areas commonly occurring when rewiring or remolding. A suitable solution is desired.

Various attempts have been made to solve problems found in electrical wire devices. Among these are found in: U.S. Patent and Publication Nos. U.S. Pat. No. 2,978,934 to Bradley; U.S. Pat. No. 4,083,105 to ViPond; and 2013/0326882 to Harvey. These prior art references are representative of wire stripping devices.

None of the above inventions and patents, taken either singly or in combination, is seen to describe the invention as claimed. Thus, a need exists for a reliable wire stripping tool, and to avoid the above-mentioned problems.

SUMMARY OF THE INVENTION

The inventor has recognized the aforementioned inherent problems and lack in the art and observed that there is a need for a compact wire stripping device.

It is therefore an object of the invention to provide a wire stripping tool, comprising: a shaft, having a first end and a second end, a handle, having a first end affixed to the shaft second end and, a cutting tool, having a first side removably attached to the shaft first end, further having a plurality of slots, each having a blade located therein. An aperture may be located within the shaft. A socket may be adapted to receive a driving tool therein, with the socket located at a second end of the handle. The plurality of slots may be configured to receive a particular gauge of wire. The first plurality of indicia is disposed upon the cutting tool. The first plurality of indicia may be adjacent a blade. Each one (1) of the first plurality of indicia is a wire gauge. The cutting tool may comprise a disc. The tool may be made of a metallic material or a non-conducive non-metallic material.

A separate embodiment comprises a second plurality of indicia that is disposed upon the cutting tool.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

10 wire stripping tool
15 cutting disc
16 slot
17 blade
18 disc indicia
19 disc aperture
20 shaft
21 shaft aperture
23 fastener
24 shaft indicia
30 handle
32 socket

DETAILED DESCRIPTION OF THE PREFERRED EMBODIMENT

The present invention is directed to a wire stripping tool 10. In one (1) embodiment, the tool 10 may comprise a cutting disc 15, a shaft 20, and a handle 30. Other parts and/or components may be included.

The tool 10 is structured and arranged to allow a user to strip and twist wires in work environments that are limited in space, such that other traditional wire stripping tools cannot be used due to space constraints.

Figure 1:
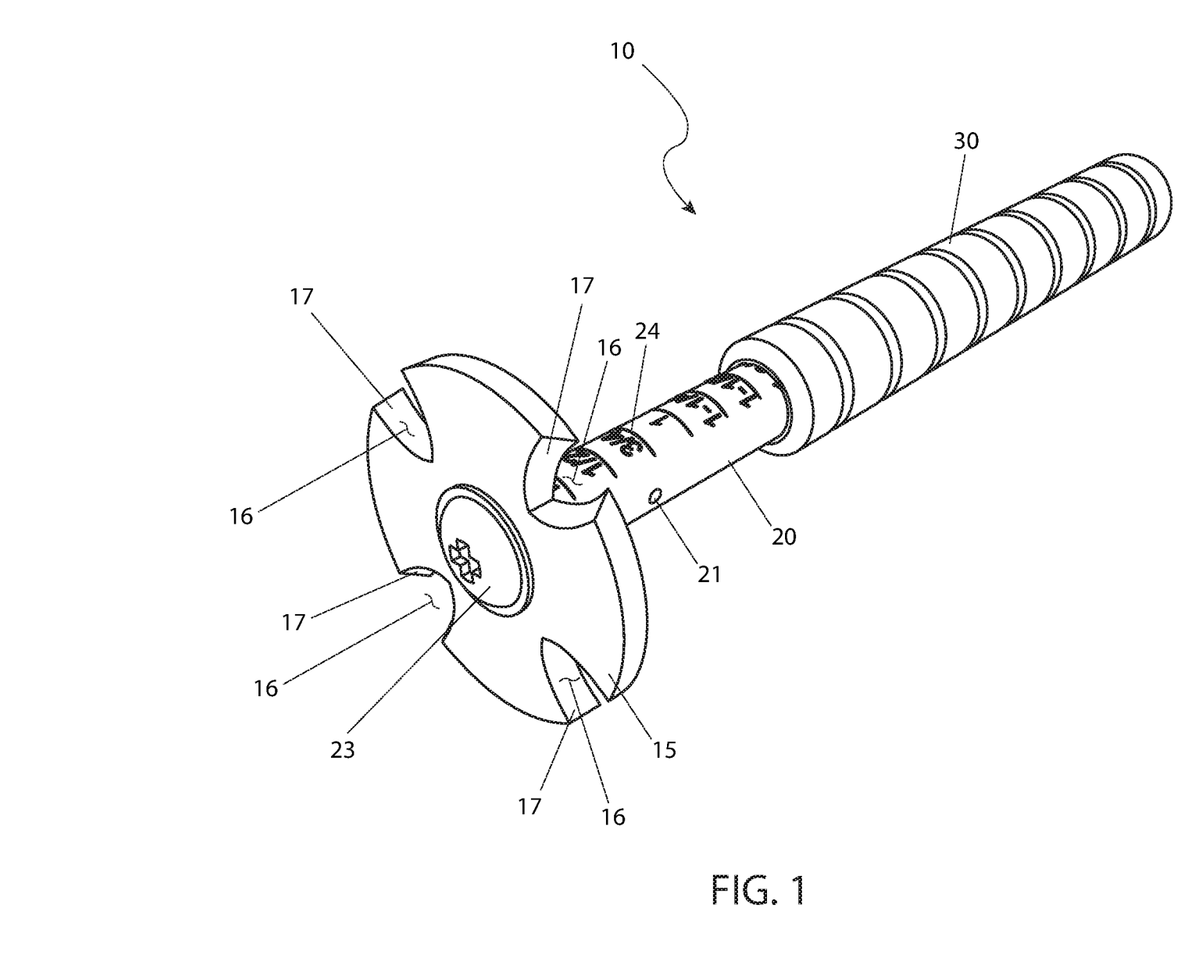
FIG. 1 is a front perspective view of a wire stripping tool 10, according to an embodiment of the present invention.

Referring now to the drawing, there is shown in FIG. 1 a perspective view of the tool 10 having a generally circular cutting disc 15 with a plurality of cutting slots 16 and a shaft 20 perpendicularly fastened to a center of a first side of the disc 15. The shaft 20 may have at least one (1) shaft aperture 21 cross drilled therethrough to allow the user to insert a stripped wire to twist or loop the conductor wire when it specific conditions require such a looped or twisted connection. Along the length of the shaft 20 is indicia 24 spaced apart by either English or metric measuring values. A first end of the shaft 20 is capable of being aligned with a disc aperture 19 of the disc 15, where are fastener 23 is routed through to fasten the shaft 20 to the disc 15.

The cutting disc 15 has a plurality of cutting slots 16 preferably located equidistant from each other. The inner surface of each cutting slot 16 has a blade 17 capable of stripping the sheathing and insulation layers of a wire. The blades 17 are angled such that they bevel inwardly from the first side to the second side of the disc 15. Each of the cutting slots 16 are sized differently in order to accommodate conventional wire sizes. (e.g., 10, 12, 14, 16 gauge, etc.). Indicia 18 is located on the second side of the disc 15 adjacent each slot 16 to identify the type of gauge that particular slot 16 is capable of stripping.

The shaft 20 comprises a tubular body having the first end and a second end. The second end of the shaft 20 may be attached to or form an integral part of a first end of an ergonomic handle 30. The opposing second end of the handle 30 incorporates a quarter (¼) drive aperture in order to accommodate a ratchet or similar type hand tool. The quarter (¼) drive may also accommodate different tools, such as screwdrivers or sockets.

Uses of the tool 10 may include both solid core wires as well as stranded/braided wires. Also, the tool 10 may be used on most all types of conductors (e.g., copper, aluminum, etc.). The tool 10 may be constructed from any suitable material. Such materials may include metallic materials for durability and longevity during use, as well as non-metallic materials such that the tool 10 is not electrically conductive for safety.

Figure 2:
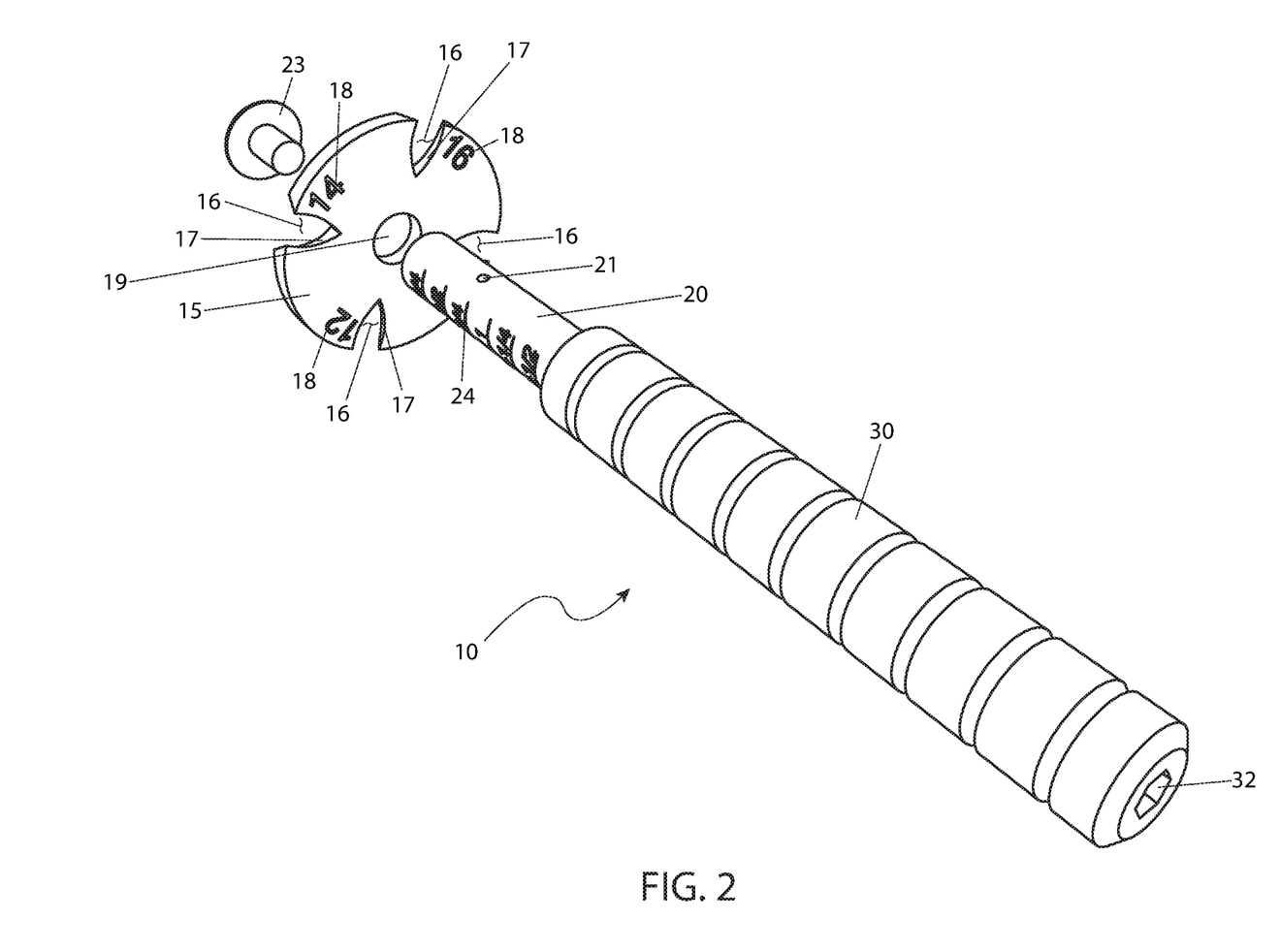
FIG. 2 is a rear perspective exploded view of the wire stripping tool 10, according to an embodiment of the present invention.

Referring now to FIG. 2, a rear perspective exploded view of the wire stripping tool 10, according to an embodiment of the present invention is disclosed. The tool 10 comprises the cutting disc 15 secured to the shaft 20 by use or a fastener 23. The cutting disc 15 comprises a plurality of cutting sections or slots 16 disposed circumferentially about the exterior edge of the disc 15. The interior edge of each slot 16 comprises an edged portion or blade 17. A plurality of disc indicia is disposed on a side of the cutting disc 15 which faces the handle 30. The shaft aperture 21 is disposed within the shaft 20. A socket 32 is disposed within the handle opposite the cutting disc 15.

Figure 3:
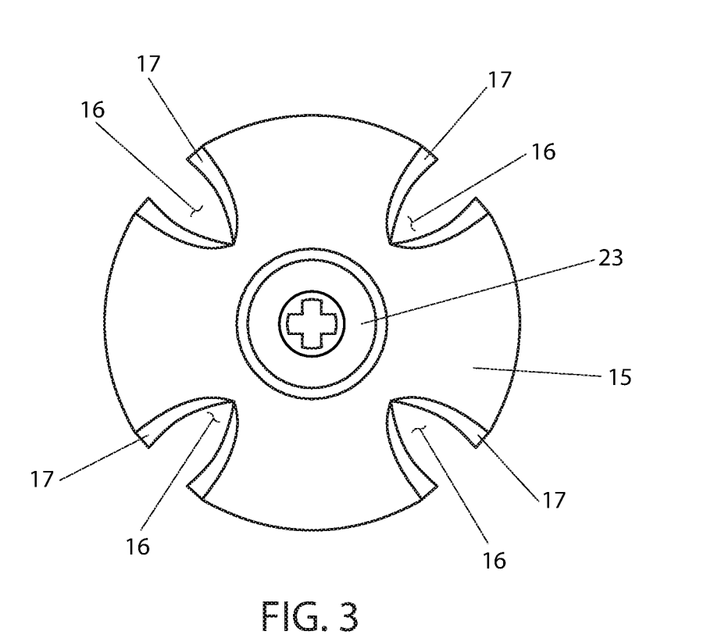
FIG. 3 is a front elevation view of the wire stripping tool 10, according to an embodiment of the present invention.

Referring now to FIG. 3, a front elevation view of the wire stripping tool 10, according to an embodiment of the present invention is disclosed. The cutting disc 15 is shown with a centrally-located fastener 23, a plurality of slots having a plurality of bladed interior edges 17.

Figure 4:
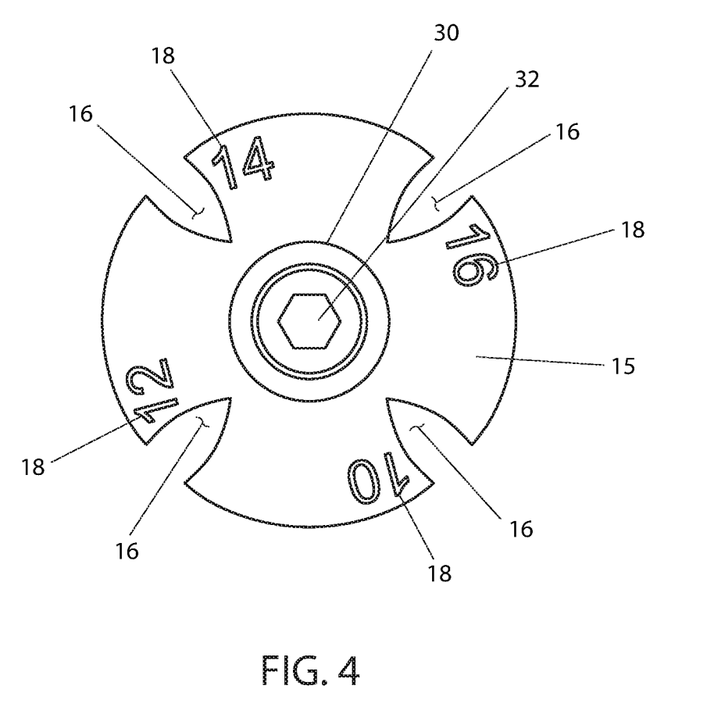
FIG. 4 is a rear elevation view of the wire stripping tool 10, according to an embodiment of the present invention.

Referring now to FIG. 4, a rear elevation view of the wire stripping tool 10, according to an embodiment of the present invention is disclosed. The cutting disc 15 is shown with a centrally located fastener 23, a plurality of slots and a plurality of disc indicia 18.

Figure 5:
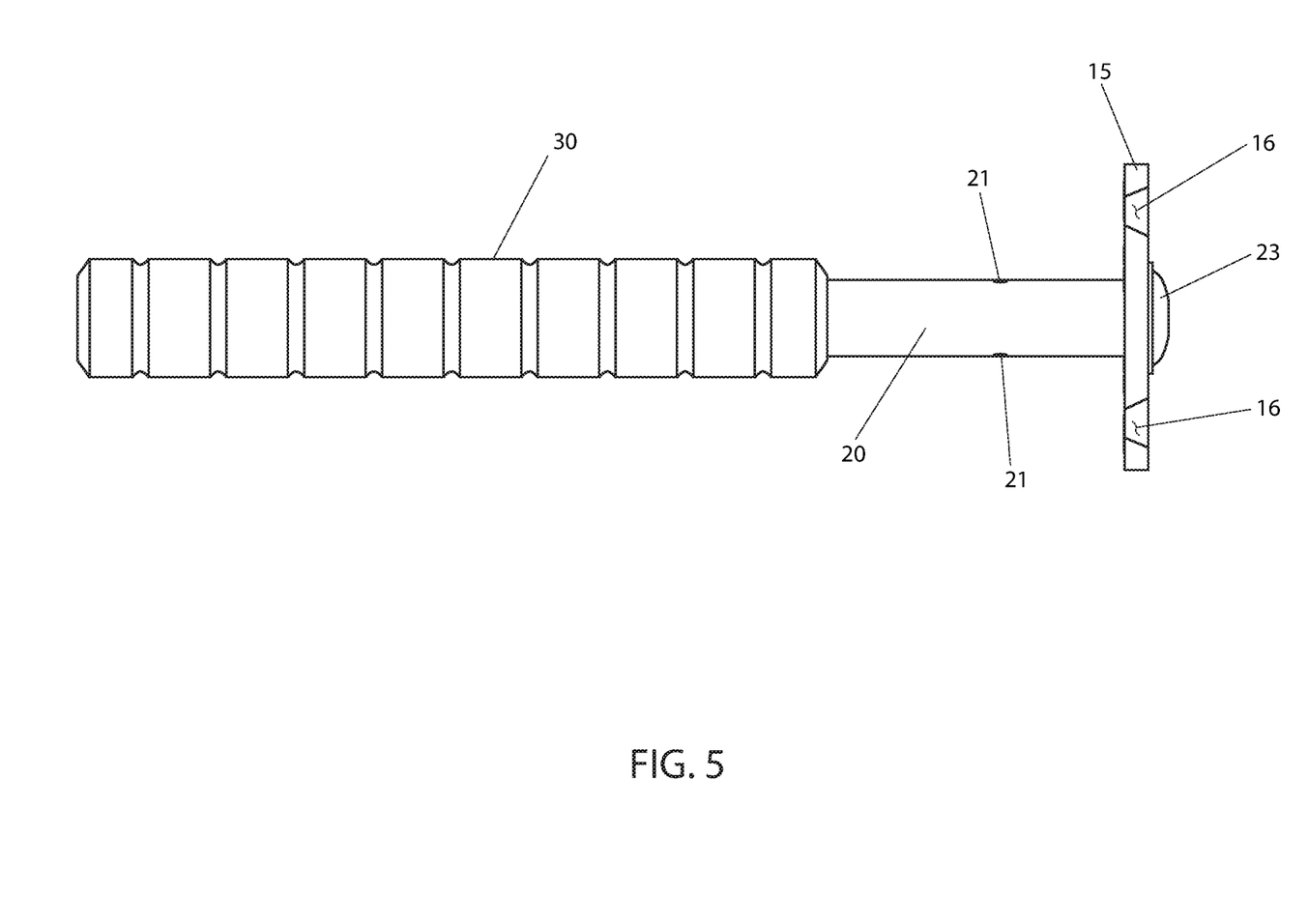
FIG. 5 is a right elevation view of wire stripping tool 10, according to an embodiment of the present invention.

Referring now to FIG. 5, is a right elevation view of wire stripping tool 10, according to an embodiment of the present invention is disclosed. The cutting disc 15 is secured to shaft 21 by a centrally located fastener 23. The handle 30 is disposed opposite the cutting disc 15. The cutting disc comprises plurality of slots 16.

Figure 6:
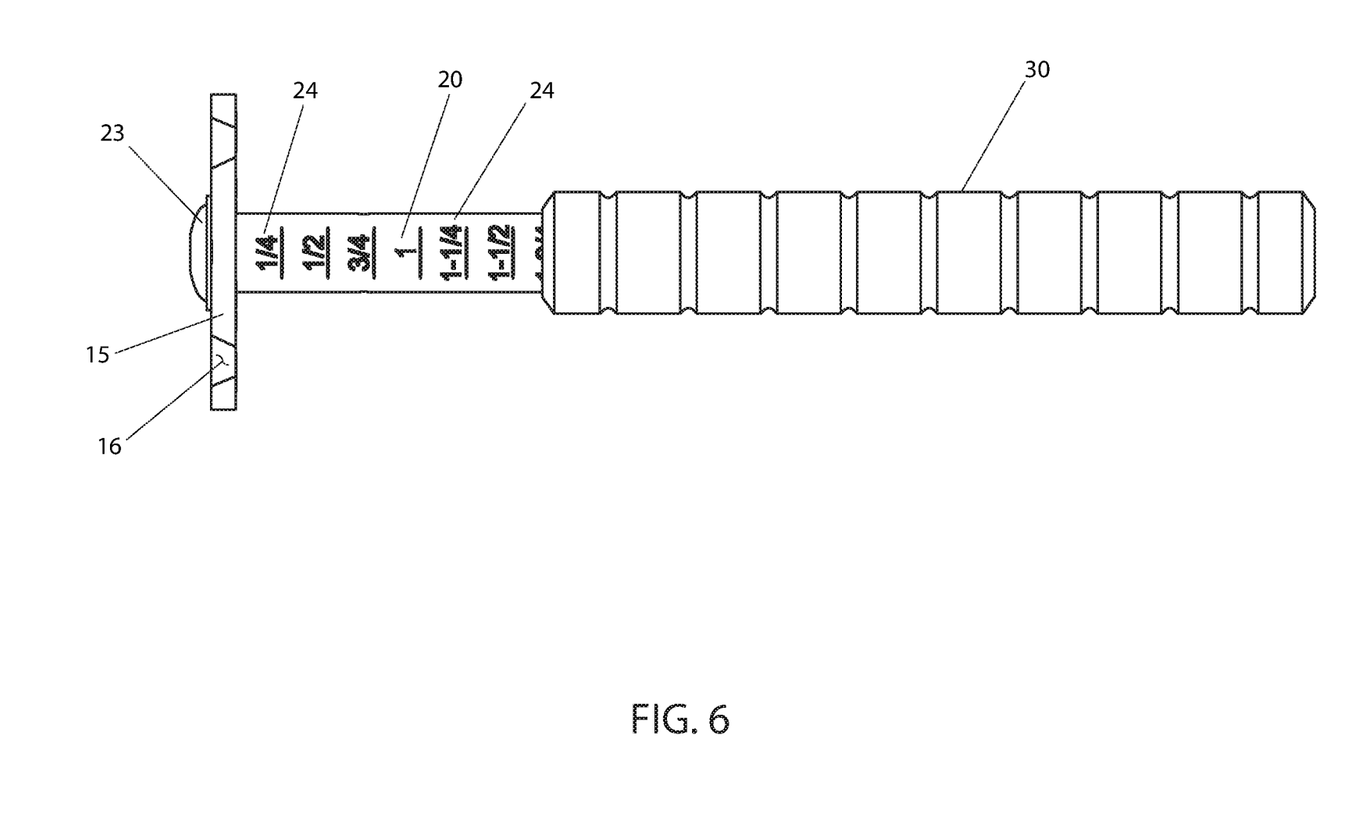
FIG. 6 is a left elevation view of wire stripping tool 10, according to an embodiment of the present invention.

Referring now to FIG. 6, is a left elevation view of wire stripping tool 10, according to an embodiment of the present invention is disclosed. The cutting disc 15 is secured to the shaft 20 by a centrally located fastener 23. The handle 30 is disposed opposite the cutting disc 15. The cutting disc comprises plurality of slots 16. The shaft 20 is also show with a plurality of staff indicia 24.

Figure 7:
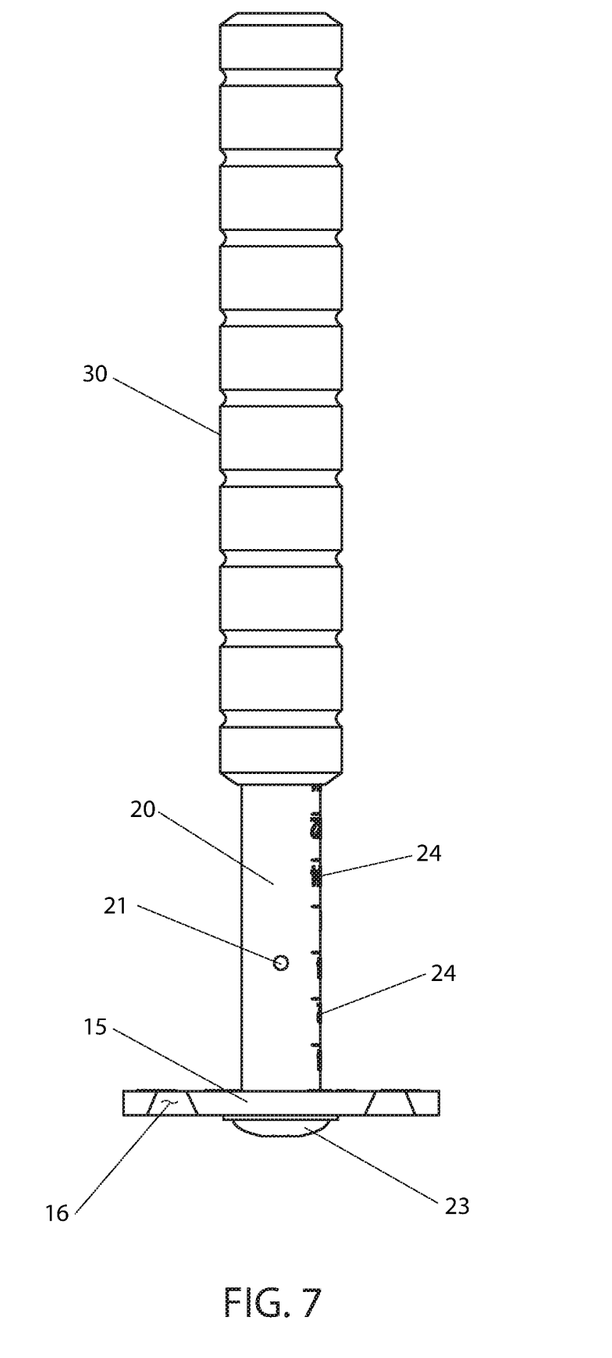
FIG. 7 is a top plan view of the wire stripping tool 10, according to an embodiment of the present invention; and, FIG. 8 is a bottom plan view of the wire stripping tool 10, according to an embodiment of the present invention.

Referring now to FIG. 7, is a top plan view of wire stripping tool 10, according to an embodiment of the present invention is disclosed. The cutting disc 15 is secured to the shaft 20 by a centrally located fastener 23. The handle 30 is disposed opposite the cutting disc 15. The cutting disc comprises plurality of slots 16. The shaft 20 is also show with a plurality of staff indicia 24.

Figure 8:
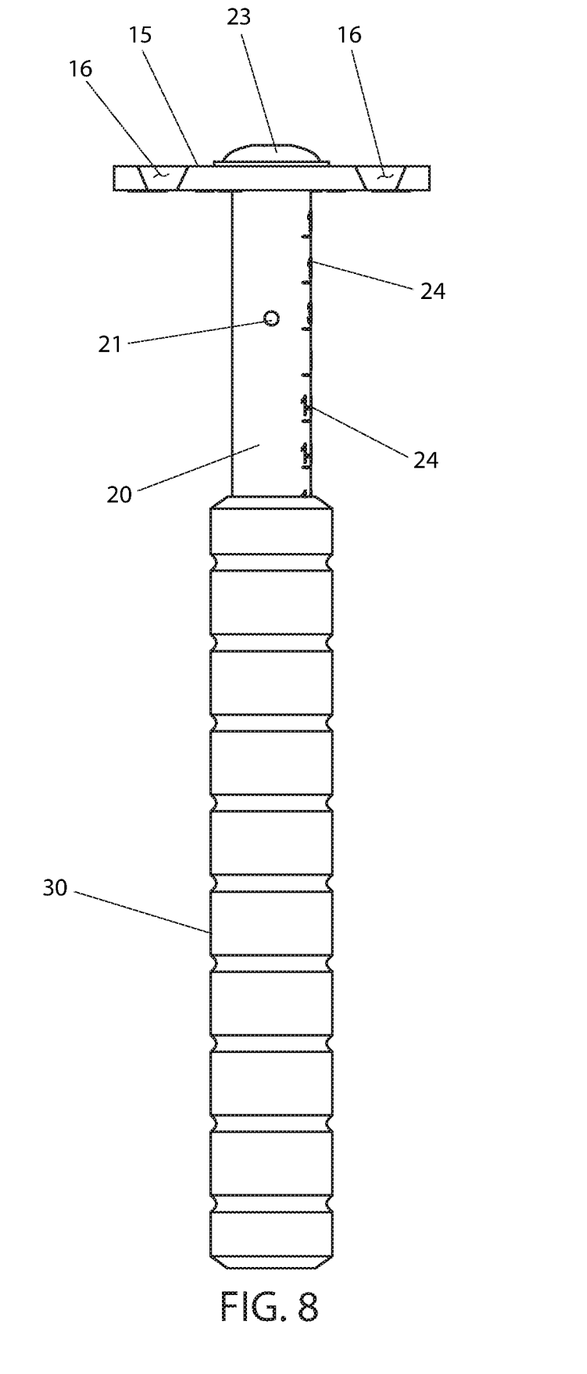

Referring last to FIG. 8, is a top plan view of wire stripping tool 10, according to an embodiment of the present invention is disclosed. The cutting disc 15 is secured to the shaft 20 by a centrally located fastener 23. The handle 30 is disposed opposite the cutting disc 15. The cutting disc comprises plurality of slots 16. The shaft 20 is also show with a plurality of staff indicia 24.

The tool 10 is used by first holding the handle 30 in hand and choosing the gauge of the wire to be stripped. Then the user locates the corresponding size of the slot 16 needed to be used, based on the indicia 18 marked on the cutting disc 15. The disc 15 is placed back to the distance desired strip the wire. Once the distance is established, the wire is pressed into the appropriate cutter with the thumb of the user's hand holding the handle 30 until the blade 17 cuts through the wire's insulation.

Next, preferably with a twisting motion, the tool 10 is turned in a clockwise or counterclockwise rotation approximately ½ rotation to finish the cut while holding the wire with a free hand. Next the tool 10 is pulled back while holding the wire and the wire is now stripped. An additional loop can be created on the conductor by placing the wire in the aperture 21 located behind on the shaft 20 and turning. This action works well for pre-forming the conductor for fastening to a screw for a more secure connection. If needed, a quarter (¼) drive tool can be inserted into the socket 32 of the handle 30 for added torque.

The exact specifications, materials used, and method of use of the tool 10 may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A wire stripping tool, consisting of:
   a hollow shaft having a first end, a second end, and a first plurality of indicia disposed upon said hollow shaft, said hollow shaft having a tubular body;
   a single cylindrical ergonomic elongated handle having a first end affixed to said hollow shaft second end;
   a cutting disc having a first side perpendicularly and removably attached to said hollow shaft first end by means of a screw, further having a plurality of slots, each of said slots having a blade located therein, said blades are angled such that they bevel inwardly from the first side to a second side of said cutting disc;
   an aperture located within said shaft; and
   a socket adapted to receive a driving tool therein, said socket is located at a second end of said single cylindrical elongated handle;
   wherein a second plurality of indicia is disposed upon said cutting disc; wherein each one of said second indicia is adjacent to one of each said blades;
   wherein each one of said second indicia is a wire gauge; and, wherein each of said slots is configured to receive a particular gauge of wire.

\* \* \* \* \*